United States Patent [19]

Schuler

[11] Patent Number: 4,563,218

[45] Date of Patent: Jan. 7, 1986

[54] ANTISLIP AGENT

[76] Inventor: Jakob Schuler, Rechbergweg 49, 7900 Ulm/Donau, Fed. Rep. of Germany

[21] Appl. No.: 655,886

[22] Filed: Sep. 28, 1984

[30] Foreign Application Priority Data

Sep. 30, 1983 [DE] Fed. Rep. of Germany ....... 3335522

[51] Int. Cl.$^4$ ................................................. C09K 3/14
[52] U.S. Cl. ........................................ 106/36; 106/230
[58] Field of Search ................ 106/36, 6, 230; 424/69

[56] References Cited

U.S. PATENT DOCUMENTS

| | | | |
|---|---|---|---|
| 2,141,575 | 12/1938 | Warp | 106/230 |
| 2,443,221 | 6/1948 | Bergstein | 106/270 |
| 2,987,447 | 6/1961 | Ward | 424/69 |
| 4,071,374 | 1/1978 | Minton | 106/204 |
| 4,105,462 | 8/1978 | Thanos | 106/218 |

FOREIGN PATENT DOCUMENTS 1468517 5/1977 United Kingdom .

OTHER PUBLICATIONS

Chem. Abst. 48:3707b, Mazee et al.

*Primary Examiner*—Theodore Morris
*Attorney, Agent, or Firm*—Karl F. Ross; Herbert Dubno

[57] ABSTRACT

An antislip composition for application to the handle of sporting apparatus such as tennis rackets and which does not transfer readily to the hand and remains effective even with a high degree of sweating, consists essentially of 10 to 50% by weight of rosin, 10 to 40% by weight of microcrystalline wax, 10 to 50% by weight dammar resin or a synthetic resin with similar properties and the balance to 100% by weight paraffin.

6 Claims, No Drawings

ANTISLIP AGENT

FIELD OF THE INVENTION

My present invention relates to an antislip agent and, more particularly, to a composition adapted to be applied, e.g. to the hand, of a sports person to facilitate an effective grip of a sporting implement. Specifically the invention relates to an antislip composition which can be used for tennis rackets and the like to improve the grip of the player or the handle of the racket.

BACKGROUND OF THE INVENTION

It is known that in many sports it is essential that the player be able to grip a playing implement with a minimum of slip, without however losing the touch sensitivity and control which is required for the particular sport. Typical of sports in which this is the case is tennis in which the racket must be gripped by the hand of the player with a minimum of unwanted slip.

For this purpose rosin and chalk in pulvurulent form have been used heretofore and indeed the development of an effective antislip composition has evoked various interests to the point that even more complex antislip compositions have been developed. Typical of these compositions is one which contains rosin, microcrystalline hydrocarbons (microcrystalline waxes or micro waxes) and paraffin. One such composition is described in British patent specification No. 1,468,517.

The composition of this patent is applied to the hand or the fingers to prevent slip of sporting implements such as rackets or paddles for ball sports, bowling balls and the like. The conventional composition for this purpose comprises between 0.5 and 1% of its total weight rosin, up to 10% of the total weight microcrystalline wax and between 0.5 and 5% of the total weight water-free lanolin, the balance being paraffin, coloring ingredients and perfuming ingredients.

The lanolin preparation is sufficiently high so that the mixture is comparatively soft and easily adheres to the fingers and the skin but nevertheless is sufficiently hard or dry to prevent smearing.

In the fabrication of this composition, the components are mixed together and melted or otherwise formed into a melt which is cooled under slow stirring and shortly before solidification is cast into molds of the desired shape so that the composition can be made available to the consumer in a solid bar-like form, such as soap bars or packages. A disadvantage of this antislip agent is the need to coat it onto the hands and thus it is necessary to wash the agent from the hands or wipe the agent from the hands subsequently. In addition, when the hand grips the implement, the material is transferred thereto and can accumulate on the handle or on the implement so that one then grips it with clean hands when it is soiled. The accumulations of the antislip agents tends to pick up dirt and other contaminants so that this is yet another disadvantage.

In the publication *Eurosport & Freizeitmode* 10/1977, page 1796, a spray for the grip of a tennis racket is described which, when applied to the handle of the racket maintains the band or strap which is wound to form this handle relatively soft and grippable so that the player has improved impact control. Nothing is said in this publication, however, as to the composition and characteristics of this spray.

OBJECTS OF THE INVENTION

It is the principal object of the present invention to provide an antislip agent, particularly for sports equipment which may be engaged by the hands of a user or player which will overcome the drawbacks of earlier antislip agents as described.

A more specific object of this invention is to provide an improved agent which can be applied to the grippable surface of a piece of sporting equipment and which enables the slip of this equipment relative to the hand to be prevented or limited even when the player's hand may be covered with a layer of sweat or may develop a sweaty layer during play.

Another object of the invention is to provide an antislip agent of the latter type which does not significantly transfer to the hand and which will neither constitute a contaminant for the hand nor serve as a basis for contaminants which can thus adhere to the hand.

DESCRIPTION OF THE INVENTION

I have discovered, quite surprisingly, that, when the antislip composition comprises a large proportion of each of the ingredients dammar resin, rosin, microcrystalline wax and paraffin, the resulting combination can be applied to the grip of tennis rackets or like sporting implements with long-term antislip effectiveness, even in the presence of moisture such as sweat without any significant transfer to the hand of the user so that it in effect is a noncontaminating composition with respect to the user. The dammer resin can be replaced entirely or in part with the partially synthetic resins formed by esters of stabilized balsam resin (gum rosin), root rosin or tall oil resin with polyhydric alcohols, preferably pentaerithrites or glycerine.

More specifically, an antislip composition according to the invention consists essentially of 10 to 50% by weight rosin (kolophonium), 10 to 40% by weight microcrystalline wax, 10 to 50% by weight dammar resin or one of the partially synthetic resins described as a replacement thereof or both, with paraffin making up the composition to 100% by weight.

Preferably the mixture consists of 30% by weight dammar resin, 20% by weight rosin, 30% by weight microcrystalline wax and 20% by weight paraffin.

As noted, the dammar resin containing the composition permits application of the antislip agent to the grip or other handle surface of the sporting equipment with minimum transfer to the hand of the user in use and without any detrimental effect to the grip surface. The antislip characteristics are excellent and are present even with strong sweating of the hand.

Because the reduction in slip is not affected by sweating, the need to grip the racket with the high force hitherto considered to be necessary is diminished and the stress upon the hand and arm musculature is reduced.

Indeed, I have found a significant reduction in the risk of tennis arm and tennis elbow with the use of the antislip composition of the invention. By corresponding variation in the proportion of dammar resin in the mixture I can vary the antislip characteristics for different sporting equipment in different ways to specific needs.

According to a feature of the invention, less than 50% by way of an alloying meltable synthetic wax can be added to the composition, this wax being supplied in an amount such that the melting point of the mixture and thus its hardness is increased. This is highly advantageous when the antislip composition is to be utilized in warm regions since the product is stabilized thereby.

The composition can be put up in solid form as bars, rods, pins, blocks, cubes, granulates and powers although it can also be employed as a paste and, when dissolved in a solvent or dispersed in a liquid medium, as a spray.

SPECIFIC EXAMPLE

30% by weight dammar resin (melting point 110° to 130° C., 20% by weight rosin (kolophonium), 30% by weight microcrystalline wax (melting point 68° to 72° C.) and 20% by weight paraffin are melted together to form a homogeneous flowable mixture.

The mixture is stirred and slowly cooled and shortly before solidification (solidification point=50° C.) is cast into molds of the desired shape, preferably rods or small blocks similar to soap. The hardening then occurs and the solid product is rubbed onto the handle of the sport implement involved, e.g. tennis rackets.

Tests have shown that the material does not transfer significantly to the hand when the racket is conventionally held and that the composition provides significant improvement in the slip resistance of the handle.

If the hardening point is to be raised, I add up to 5% by weight of an alloyable synthetic wax, especially polyethylene wax with a melting point between 95° and 100° C., such as epoline C 16 or polyethylene AC 8. The dammar resin can be replaced in whole or in part by a partially synthetic resin marketed by Nordmann & Rassmann Co. of Hamburg, Germany under the trademark Superester A 100, this product containing pentaerithrite esters of stabilized gum resin, the pentaerithrite being a tetrahydric alcohol. Similar results can be obtained by the addition of glycerine as a trihydric alcohol for the esterification agent. Instead of the gum resin, root resin or tall oil resin can be used.

I claim:

1. An antislip agent for application to a piece of sporting equipment engageable by the hand of a sports person comprising:
   10 to 50% by weight rosin, 10 to 40% by weight microcrystalline wax and 10 to 50% weight dammar resin.

2. The antislip agent defined in claim 1 which consists of 30% by weight dammar resin, 20% by weight rosin, 30% by weight microcrystalline wax and 20% by weight paraffin.

3. The antislip agent defined in claim 1 further comprising meltable synthetic polyethylene wax in an amount effective to increase the melting point of said agent.

4. The antislip agent defined in claim 1 wherein the rosin is kolophonium.

5. The antislip agent defined in claim 1, further comprising paraffin in an amount to provide the balance of the antislip agent.

6. An antislip agent for application to a piece of sporting equipment engageable by the hand of a sports person comprising 10 to 50% by weight rosin, 10 to 40% by weight microcrystalline wax, 10 to 50% by weight of a partially synthetic resin selected from the group consisting of esters of stabilized gum rosin, root resin and tall oil resin with polyhydric alcohols, and a meltable synthetic polyethylene wax in an amount effective to increase the melting point of said agent.

* * * * *